United States Patent [19]

Niwayama

[11] Patent Number: 5,363,357
[45] Date of Patent: Nov. 8, 1994

[54] FOCUS CONTROL SYSTEM
[75] Inventor: Masaki Niwayama, Hyogo, Japan
[73] Assignee: Mitsubishi Denki Kabushiki Kaisha, Tokyo, Japan
[21] Appl. No.: 961,529
[22] Filed: Oct. 15, 1992
[30] Foreign Application Priority Data
Oct. 16, 1991 [JP] Japan .................................. 3-266621
[51] Int. Cl.⁵ .............................................. G11B 7/09
[52] U.S. Cl. ............................ 369/44.27; 369/44.25; 369/44.34; 369/44.35; 369/44.29; 250/201.5
[58] Field of Search ............... 369/44.11, 44.25, 44.23, 369/44.28, 44.14, 44.12, 44.15, 44.34, 44.27, 44.29, 44.35; 250/201.5

[56] References Cited
U.S. PATENT DOCUMENTS
5,132,948  7/1992  Ishibashi ........................... 369/44.41
5,233,585  8/1993  Deute et al. ...................... 369/44.25

FOREIGN PATENT DOCUMENTS
1173441    7/1989  Japan .
3-154234  11/1989  Japan .
444327     7/1992  Japan .

Primary Examiner—Aristotelis Psitos
Assistant Examiner—Muhammad N. Edun

[57] ABSTRACT

The inventive focus control system for optical recording/playback apparatus performs the initial focus pull-in operation for bringing the focused beam spot right on the recording medium surface through the focus sweep operation. The light beam focus position is moved under velocity control based on the relative velocity between the focus position and the recording surface detected through envelope detection and differentiation of the signal produced from the reflected light beam from the recording medium surface.

34 Claims, 12 Drawing Sheets

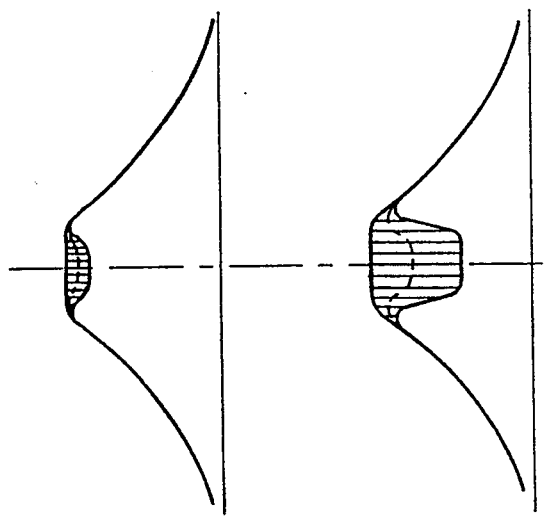
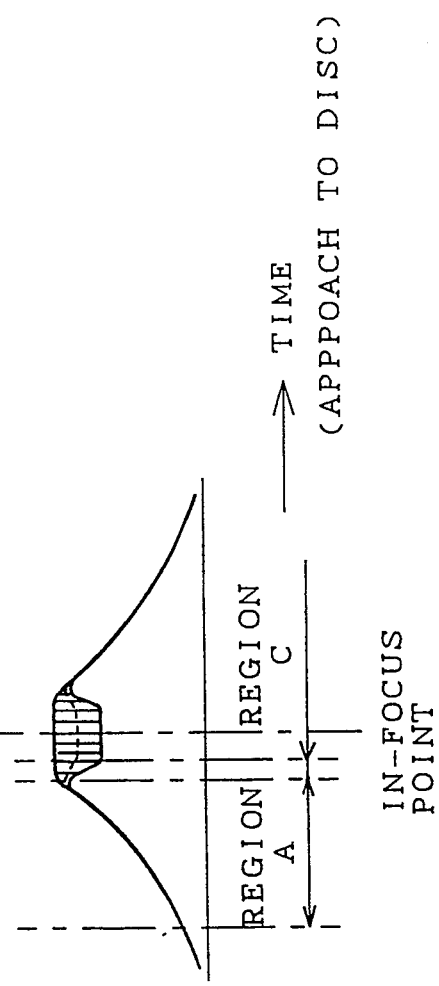
FIG. 13a  BEAM SPOT LOCATED BETWEEN TRACKS
FIG. 13b  BEAM SPOT LOCATED ON TRACK
FIG. 13c  COMPOSED SUB SIGNAL

FOCUS CONTROL SYSTEM

BACKGROUND OF THE INVENTION

1. Field of the Invention

The present invention relates to a focus control system used in optical recording and/or playback apparatus, and particularly to the technique of initial pull-in of a focus servo operation.

2. Description of the Prior Art

For optical recording and/or playback apparatus represented by compact disc players and video disc players, it is necessary to position the focal point (beam waist) of the reading and/or recording laser beam accurately to the recording surface of the disc, and the focus servo operation has this performance.

The focus servo operation necessitates an initial pull-in operation (will be termed simply "pull-in operation" hereinafter) at the beginning of the focusing operation. The reason for this operation is that the characteristics of focus error detection for detecting the displacement of the laser beam focus position from the recording surface have a very narrow linear range as compared with a swing motion of the disc surface and therefore the laser beam cannot be brought to the in-focus state by simply closing the servo loop (position feedback loop).

The following explains a conventional focus servo system used in an optical compact disc player based on the "three-beam, tracking generation" scheme. FIG. 1 shows the arrangement of the focus servo system used in the conventional compact disc player (CD player), in which reference numeral 1 denotes an optical recording disc, 2 is a spindle motor which rotates the disc, and 3 is an optical pickup device.

The pickup 3 is made up of a housing 31, an objective lens 32 for converging the reading laser beam to form a small light spot, a focus coil 33 which constitutes a moving member together with the objective lens 32, a suspension 34 which supports the moving member so that it is movable in the direction normal to the disc surface, and a magnetic circuit 35 including a magnet for driving the moving member in response to a current supplied to the focus coil.

The pickup 3 further includes a laser diode 36 as a light source, a diffraction grating 37 which splits the laser beam into a main beam and two subordinate beams, and an optical sensor 38 which detects the intensity of return beams from the disc 1 separately in multiple areas of its sensing surface and produces electric current outputs (the optical sensor 38 seen from above its light incident surface is shown by enlargement beneath the pickup 3). The optical sensor 38 has four light sensing areas A, B, C and D for receiving the main beam, and light sensing areas E and F for receiving the two subordinate beams separately.

Indicated by 39 is a half-mirror which deflects the laser beam from the laser diode 36 by 90° toward the disc 1 and transmits the return beam from the disc 1 to the optical sensor 38. The half-mirror 39 also functions to provide astigmatism for the return beam of the main beam in proportion to the displacement of the laser beam focus position from the recording surface of the disc 1, and the state of astigmatism is detected by the divisional optical sensor 38 thereby to detect the focus error. A laser control circuit 4 which controls the optical output of the laser diode 36 is placed outside the pickup 3.

In FIG. 1, indicated by reference numerals 5 through 8 are a first through fourth current-to-voltage converters which convert the current outputs of the divisional optical sensor 38 into voltage signals. Reference numerals 9 is a first subtracter, the output of which becomes the tracking error signal. Reference numeral 10 is a first adder, the output of which is called "RF signal" and it becomes the main signal which carries reproduced information. Reference numeral 11 is a second subtracter, the output of which becomes the focus error signal. Reference numeral 12 is an in-focus state detector, reference numeral 13 is a second switch which opens or closes the servo loop. Reference numeral 14 is a loop filter which stabilizes the servo system and increases the loop gain. Reference numeral 15 is a second adder, the output of which drives the focus coil 33.

Indicated by reference numeral 16 is a sweep signal generator for producing a saw-tooth waveform, in which are included a first voltage source 161 for providing a positive voltage $V_1$, a second voltage source 162 for providing a negative voltage $-V_1$, a constant current source 163, a third switch 164, and a capacitor 165. Indicated by reference numeral 17 is a first switch which selects as to whether or not the output of the sweep signal generator 16 is to be fed to the second adder 15. Reference numeral 18 is a logical inverter, and reference numeral 19 is a centralized controller including a CPU, the roles of which include control of the pull-in operation.

The focus error signal produced by the second subtracter 11 has characteristics of detection as shown in FIG. 2. The focus error signifies inherently the distance between the position of focal point (focus position) of the laser beam and the recording surface of the disc, and the detected focus error is ideally related linearly with the true focus error as shown by the dashed line in FIG. 2. Actually, however, due to the conversion of the focus displacement into astigmatism and the emergence of eclipse caused by the limit in the aperture area of the objective lens 32, the sensing area of the optical sensor 38 and the width of light paths, the characteristic curve deviates from the ideal line and becomes to decline oppositely as the focus displacement grows to a certain value and eventually the detection output falls to zero, as shown by the solid line.

The S-shaped characteristic curve of FIG. 2 has in its central section a linear zone which virtually coincides with the ideal line, and this linear zone is generally defined within a width of ±4 to ±8 μm. The focus servo system is designed to amplify the focus error signal and apply the signal to the focus coil 33 to move the objective lens 32 so that the focus error decreases to zero. This purpose is virtually accomplished when the servo system operates in the linear zone.

On the other hand, the compact disc 1 has a tolerant surface vibration of ±0.4 mm as stated by the standard of CD, which is incomparably greater than the width of linear zone. On this account, it is very difficult to bring the objective lens to the in-focus state by simply closing the focus servo loop. Specifically, when the focus servo loop is closed in a state far from the in-focus state, the focus error signal is virtually zero, i.e., the system has a zero loop gain, and the objective lens 32 is not driven to the in-focus point, or in the case of a state nearer to the in-focus state, the characteristic gradient opposite to the ideal line exerts a positive feedback on the servo system, causing the lens to be driven away from the in-focus point.

In carrying out the pull-in operation, the objective lens is moved in a wide range to find the in-focus point, with the servo loop being open, and then the loop is closed in the vicinity to the in-focus point. The principle of producing astigmatism in response to the focus displacement by the half-mirror 39 is known in the art, and the explanation thereof is omitted.

Next, the operation of the in-focus state detector 12 will be explained with reference to FIG. 3. The in-focus state detector 12 is a zero-cross comparator having hysteresis characteristics for the input focus error signal, and it produces an output signal called "FZC" (focus zero cross) signal. The waveforms of FIG. 3 are plotted along the horizontal axis which represents the distance between the focus position and the disc surface, and the input signal is derived from FIG. 2. The FZC signal goes high when the focus error signal increases across a positive threshold as the focus position approaches the disc surface, and it turns low when the focus error signal falls across the zero level at the in-focus point. Accordingly, the FZC signal indicates the in-focus state by its falling edge.

Next, the pull-in operation of the focus servo system arranged as described above will be explained with reference to FIG. 4 and FIG. 5. FIG. 4 is a flowchart showing the operation of the centralized controller 19 during the initial focus pull-in operation, and FIG. 5 is a waveform diagram showing the principal signals and switch positions during the operation.

In FIG. 4, block 100 indicates the setting of the switches before the commencement of pull-in operation, i.e., before the time point t1 in FIG. 5. At this time point, the second switch 13 is off, causing the servo loop to be open, the third switch 164 is on, causing the sweep signal generator 16 to provide the fixed output $-V_1$, and the first switch 17 is on, causing the second adder 15 to receive the output of the sweep signal generator 16. Consequently, a negative voltage is applied to the focus coil 33, and it keeps the objective lens 32 located at the lowest end of its vertical moving range. In this system, the objective lens 32 is driven to go away from the disc surface in response to the application of a negative voltage to the focus coil 33.

When the playback start command is entered (not shown), the sequence proceeds to step 101. In step 101, a time-limit timer $T_1$ for the pull-in operation starts time-counting. In the next step 102, the pull-in operation commences by turning off the third switch 164. This time point is t1. The constant current source 163 begins to charge the capacitor 165, and the sweep signal generator 16 has its output voltage rising linearly from $-V_1$. At the same time, the focus coil drive voltage rises and the objective lens 32 is driven toward the disc surface (this operation is called "the sweep operation of the objective lens 32, or the focus sweep operation").

Step 103 tests whether or not the FZC signal produced by the in-focus detector 12 is high, as a procedure for detecting the in-focus state which is the falling edge of the FZC signal. In case the FZC signal stays low, it is tested in step 104 whether or not the time limit of the timer $T_1$ has expired. If the expiration of time limit is detected, the pull-in operation terminates in failure, or otherwise the sequence returns to step 103 to repeat the detection of a high FZC signal.

When the high FZC signal is detected (at time point t2), it is tested in step 105 whether or not the FZC signal becomes low. If a low FZC signal is not yet detected, step 106 tests the expiration of the timer $T_1$. If the expiration of time limit is detected, the pull-in operation terminates in failure, or otherwise the sequence returns to step 105 to repeat the detection of a low FZC signal. When a low FZC signal is detected in step 105 (at time point t3), step 107 turns on the second switch 13 to close the servo loop and at the same time turns off the first switch 17 to remove the output of the sweep signal generator 16 from the adder 15, and the pull-in operation completes.

At time point t3, the objective lens 32 is virtually in-focus to the disc surface. When the servo loop is closed at this time point, the objective lens 32, which may move slightly in excess (overshooting) due to the inertia, is pulled back quickly to the in-focus point by the servo action.

In FIG. 5, the lens drive voltage swings largely to the negative region immediately after the time point t3. This is a result of amplification of the focus error signal which has made an overshoot to the negative region, and the voltage produces a force for pulling back the objective lens 32 quickly. In the steady state following the time point t3, the objective lens 32 is controlled for its position so that the focus error signal becomes zero. The waveforms shown by the dashed lines after the time point t3 are the possible result of operation when the action which has been taking place up to the time point t3 continues after t3.

The foregoing pull-in operation does not always end successfully, but it can end in failure due to the contamination of the disc surface, external vibration applied to the CD player, and the like. On this account, optical recording/playback apparatus such as CD players are generally designed to repeat the pull-in operation several times so as to prevent the failure of commencement of the playback operation, although it is highly desirable to have a single successful pull-in for the quick starting of playback.

The reliability of pull-in operation, excluding such external factors as the contamination or flaws on the disc surface, is determined from the following items. 1) the width of linear zone of the focus detecting characteristics; 2) the maximum drive force (drive voltage) of the focus coil; 3) the relative velocity between the focus position (the position of objective lens) and the disc surface at the time of closure of the servo loop.

In FIG. 4 and FIG. 5, when the servo loop is closed at t3 by detecting the in-focus state accurately, the movement of the objective lens 32 beyond the in-focus point is suppressed by the servo action, as mentioned previously. Accordingly, the higher the moving speed of the objective lens 32 at t3 or the smaller the pull-in force, the farther is the turn-back position of the objective lens 32 from the in-focus point. With the turn-back position being within the linear zone of the focus error detecting characteristics, the objective lens can surely be pulled back to the in-focus point. However, in case the objective lens does not turn back from within the linear zone, the servo system does not provide an effective braking force because of a state of positive feedback due to the inverse gradient of the focus error detecting characteristics, and the probability of successful focus pull-in will fall. Accordingly, the pull-in operation is ensured by providing a large linear zone of focus detection as a braking distance.

The following describes the constraint and influence of the above-mentioned determinative factors 1)–3) of successful pull-in imposed on the system design. In regard to item 1), it is desirable to have as large linear zone of focus error detecting characteristics as possible. Although the linear zone can be increased by modifying the optical design of the pickup 3, it results in a reduced level of signals having shorter periods reproduced on the record track of the disc (the deterioration in the frequency response of signal reproduction), and therefore a drastic increase of linear zone cannot simply be done.

In regard to item 2), it is relatively easy to provide a sufficient drive force of the focus coil 33, with a possible constraint being in the case of a battery-powered CD player where the power voltage is low. In regard to item 3), it is desirable to have a sufficiently low relative velocity between the objective lens and disc surface. The determinative factors of the relative velocity in the pull-in operation will further be explained in the following.

(1) Sweep Speed in Pull-in Operation

The sweep speed is defined here to be the velocity of the objective lens in the pull-in operation, and it is set low enough to minimize the failure of pull-in. For example, CD players are typically designed to have a moving range of objective lens of about 1 mm and the pull-in speed is selected such that this range is swept in 0.7 to 2 seconds.

(2) Resonation of Objective Lens Caused by External Vibrations

When an external impact is applied to the CD player, the disc and objective lens (moving member) tend to start vibrating. In this case, if the objective lens has already been pulled in and the magnitude of impact is below a certain level, the in-focus state is retained by the servo action. However, if the lens position is not yet settled as in the midway pull-in operation, the objective lens 32 which is supported by the suspension 34 is liable to vibrate violently in response to the application of external impacts.

FIG. 6 shows the frequency response of this resonance system in which the objective lens 32 vibrates in response to the application of voltage pulses to the focus coil 33. In the figure, label fo denotes the resonant frequency, and P is the resonant amplitude indicative of the sharpness of resonance. The CD pickup 3 is designed to have fo in the range from 15 to 40 Hz in general. Because of this resonant structure, if external impacts include a frequency component closed to fo, the objective lens 32 resonates. The nearer the external vibration frequency to fo and higher the resonant amplitude, the greater is the amplitude of resonant vibration of the objective lens.

FIG. 7 shows the movement of the objective lens 32 when external impacts are applied during the focus sweep operation for pull-in (servo loop is not closed intentionally). Shown by (a) is the lens drive voltage which is identical to that shown in FIG. 5, and (b) is the physical position of the objective lens 32. Shown by the dashed line is the response in the absence of external impacts. When the objective lens resonates in the pull-in operation as shown in FIG. 7, the relative velocity between the lens and disc is so high that the objective lens can scarcely be brought to the in-focus state when the servo loop is closed.

Although the degradation of the vibration-proof focus pull-in performance due to the resonation of objective lens is not very serious for home-use CD players, it can be an imminent problem for CD players equipped in vehicles. Specifically, continuous vibrations caused by the roughness of road surface and the engine operation are the major external impacts in question. These impacts are often aggravated by the resonation of the attachment structure for the player, particularly the rubber-based unti-vibration structure intended for vehicle-mount CD players.

The experiment conducted by the inventors of the present invention in studying the influence of resonation of the objective lens caused by external impacts on the pickup of the vehicle-mount CD player reveals the following results. By designing the lens suspension system to have fo of 35 Hz or higher, the CD player equipped in a passenger car operated without a practical problem even if the resonant amplitude was very high. However, when fo was set lower, specifically below 20 Hz, for the CD player equipped in a small vehicle, the objective lens resonated violently at restarting of playback during the idling operation of the vehicle engine, with its choke valve being closed, and the player could not restart the playback operation due to faulty pull-in.

As described above, the conventional focus control system needs to set a lower sweep speed of objective lens for achieving successful pull-in and set a higher fo of pickup lens suspension system for the apparatus used in a vibratory environment, and these design conditions impose the following problems.

First, the pull-in operation time cannot be reduced due to the limited sweep speed. If it is possible to reduce the pull-in operation time, the focus position which has come off due to an external impact can be restored in a shorter time and the interruption of played-back sound can be minimized. At the same time, the playback restarting time can also be minimized. In the case of a CD-ROM disk drive unit, a short playback restarting time enables the optical system and focus servo system to halt their operation when the record on the disk is not accessed so that the life time of component parts is elongated and the power consumption is reduced, and at the same time it minimizes the increase in the wait time for the restarting of playback.

Second, a pickup having a suspension system of low fo cannot be used for apparatus which is operated in a vibratory environment. Providing a higher fo for the suspension system signifies a stiffer suspension, and it results in a dull response of the objective lens and is also undesirable for the reduction of power consumption.

For overcoming the first problem, there is proposed a technique in which the objective lens is moved at a high velocity, a current pulse is supplied to the focus coil immediately after the lens has passed the in-focus position so that it decelerates and then reverse the moving direction, and the focus servo loop is closed immediately after the lens has come back at a low velocity across the in-focus point. Although the application of a constant braking force based on this method is capable of reducing the pull-in time when the apparatus is quiescent, the movement of the objective lens cannot be anticipated in the presence of random external impacts and therefore the braking effect will be uncertain. For overcoming the second problem, there is proposed a technique as disclosed in Japanese Patent Unexamined Publication No. 59-231745 and Japanese Patent Application No. 58-106955, in which the position of the objective lens with respect to the stationary member (independent of the disc) is detected with a detection means, and a second servo system is operated in response to the detected lens position regardless of whether or not the focus servo system is in a pull-in state, thereby attaining electronically a suspension of very high fo frequency, so that the movement of the objective lens caused by external impacts is suppressed. However, this technique is not capable of increasing the sweep speed of objective lens drastically while retaining the high-grade pull-in performance, and it necessitates an additional means of position detection in the pickup.

SUMMARY OF THE INVENTION

The present invention is intended to overcome the foregoing prior art problems, and its prime object is to provide a focus control system capable of reducing the focus pull-in time drastically while retaining the high-grade pull-in performance and ensuring the pull-in operation in a vibratory environment.

The focus control system based on a first aspect of this invention comprises means for implementing the envelope detection for the output signal of an optical sensor which converts a reflected light beam from a recording medium into an electrical signal, means for differentiating the output signal of the detection means, and sweep control means which drives a focus actuator in response to a sweep command signal for moving the light beam focus position and the output of the differentiation means. In the operational phase in advance of the in-focus state of the light beam, the signal derived from the reflected light beam modulated by recorded information is subjected to envelope detection so that signal components unrelated to the focus moving speed are removed, the detected signal is differentiated thereby to evaluate the relative velocity between the focus position and disc surface, and the focus moving speed is controlled in accordance with the relative velocity.

The focus control system based on a second aspect of this invention comprises means for dividing a light beam from a light source into multiple beams, optical sensor means which converts reflected light beams from a recording medium into electrical signals, means for composing the outputs of the optical sensor means corresponding to specific light beams, means for differentiating the output of the composing means, and sweep control means which drives a focus actuator in response to a sweep command signal for moving the light beam focus position and the output of the differentiation means. In the operational phase in advance of the in-focus state of the light beams, the signals derived from the reflected light beams from the recording medium are composed so that the variation of signal levels attributable to the modulation by recorded information is averaged out, the composed signal is differentiated thereby to evaluate the relative velocity between the focus position and the disc surface, and the focus moving speed is controlled in accordance with the relative velocity.

The focus control system based on a third aspect of this invention includes means, which is disposed between the composing means and the differentiation means in the system based on the second aspect of the invention, for implementing the envelope detection for the output of the composing means. Accordingly, the composed signal is subjected to envelope detection before it is differentiated, and the relative velocity between the focus position and the disc surface is evaluated from the resulting signal.

Other objects and novel features of the present invention will become more apparent from the following detailed description taken in conjunction with the accompanying drawings. The drawings are intended solely for the illustrative purpose, and they do not confine the scope of the invention.

BRIEF DESCRIPTION OF THE DRAWINGS

FIGS. 13a–13c are a set of waveform diagrams showing the signal derived from the reflected light beam in various conditions on the disc surface according to the second embodiment of this invention.

DETAILED DESCRIPTION OF THE PREFERRED EMBODIMENTS

Preferred embodiments of this invention will be described in detail with reference to the accompanying drawings.

Embodiment 1

Figure 8:
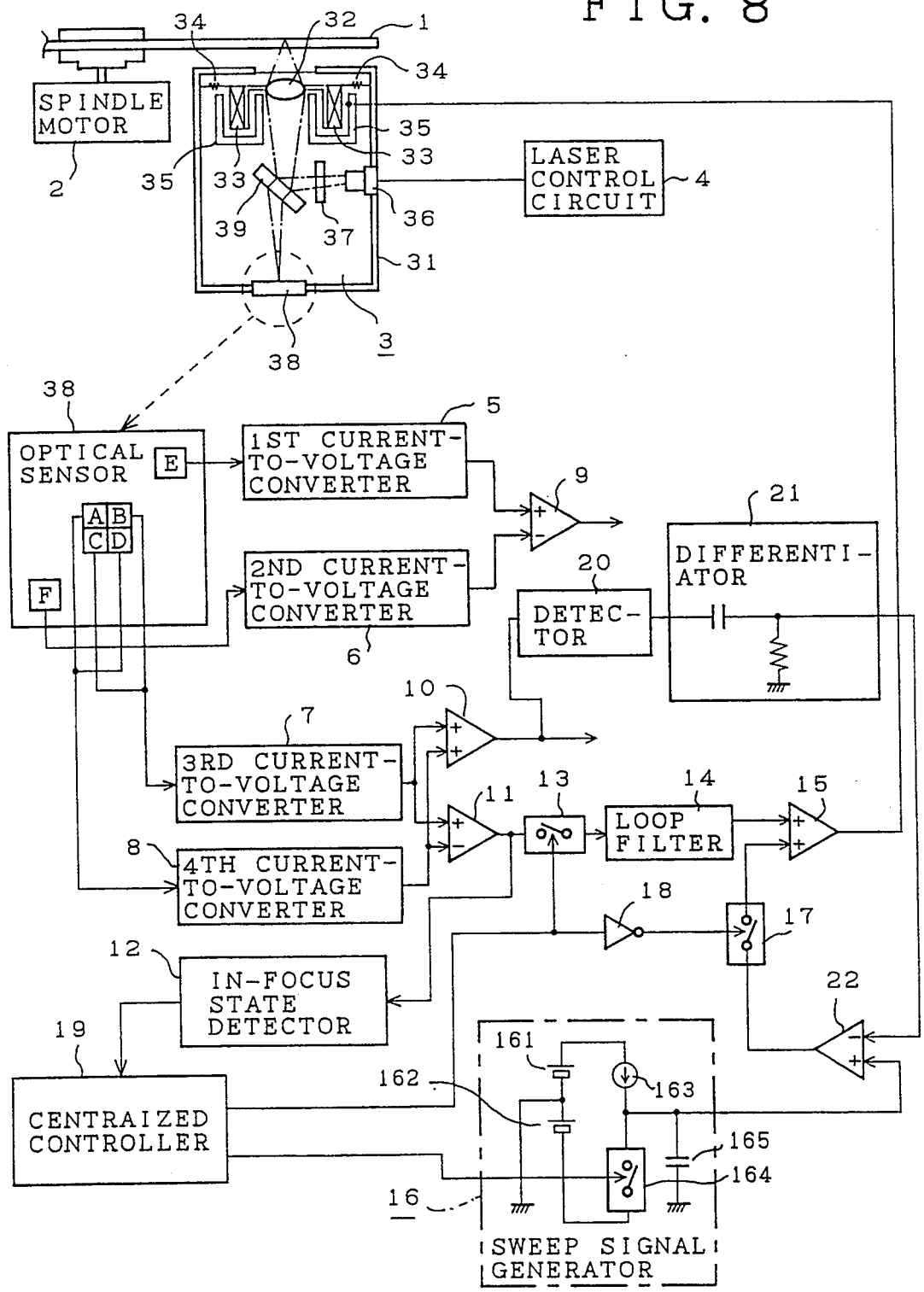
FIG. 8 is a block diagram of the focus servo system for CD players according to the first embodiment of this invention.

FIG. 8 shows the arrangement of the focus servo system for CD players according to the first embodiment of this invention. The component parts 1 through 19 are identical to those of the conventional system and the explanation thereof will not be repeated. Reference numeral 20 denotes a detector which implements the AM-mode detection for the output of the first adder 10, reference numeral 21 is a differentiator which implements a brief differentiation for the output of the detector 20, and reference numeral 22 is a third adder which sums the output of the differentiator 21 and the output of the sweep signal generator 16 and delivers the result to the second adder 15 by way of the first switch 17. The centralized controller 19 has the same role as in the conventional system.

Figure 9:
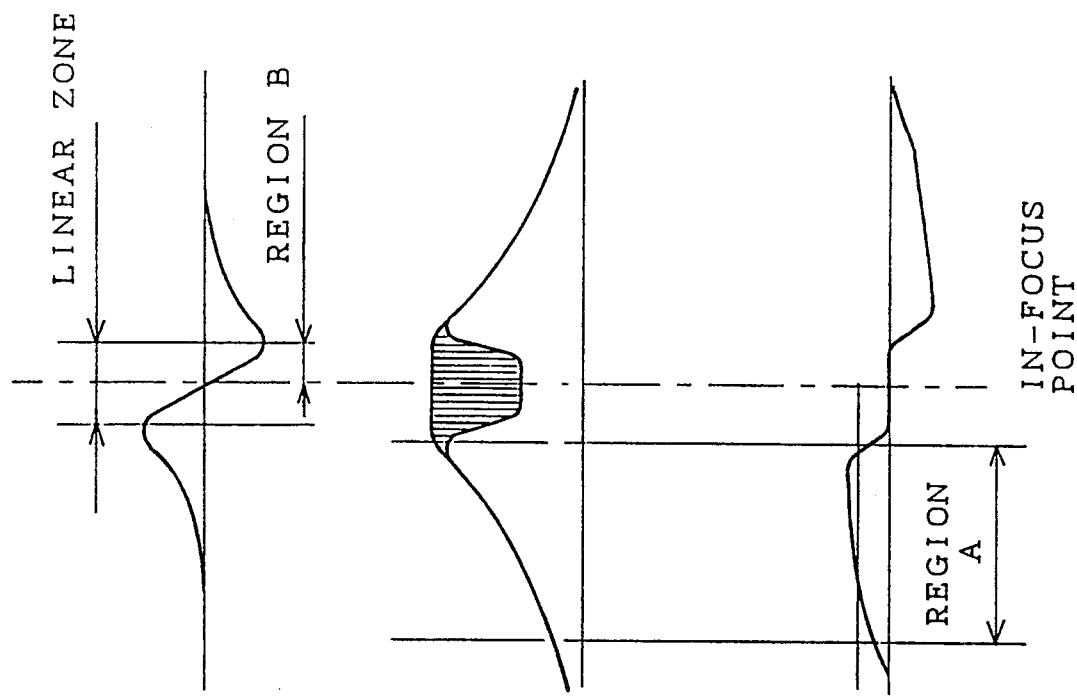
FIGS. 9a–9c are a set of waveform diagrams showing the principle of operation of this focus servo system.

Next, the principle of operation and features of this embodiment will be explained in connection with the waveform diagrams of FIGS. 9a–9c. FIG. 9a shows the focus error signal produced when the objective lens 32 is moved from the lowest position toward the disc surface at a constant velocity, FIG. 9b shows the RF signal produced by the first adder 10, and FIG. 9c shows the output of the differentiator 21.

The RF signal level rises as the objective lens 32 comes nearer to the in-focus point, since the reflected been from the disc surface has a smaller chance of eclipse within the optical system as the lens approaches the in-focus point, which results in an increased amount of light incident to the sensing area of the optical sensor 38. The RF signal includes an a.c. component (shown by hatching) in the vicinity to the in-focus point of the lens, since the reflected beam in a virtual in-focus state has the rendition of modulation by pits (recorded information) on the disc surface. The upper envelope of the waveform exhibits a virtual total reflection, while the lower envelope exhibits the lowest intensity of the return beam due to modulation.

The detector 20 which receives the RF signal has a role of extracting the upper envelope based on the AM-mode detection, and it produces a trapezoidal waveform as shown. The differentiator 21 which differentiates the output of the detector 20 is made up of a resistor and a capacitor.

Assuming that the trapezoidal output waveform of the detector 20 has a virtually constant gradient in its slope section (e.g., region A), the output of the differentiator 21 for this slope section is virtually proportional to the relative velocity between the objective lens 32 and the disc 1. During the focus sweep operation before the in-focus state is reached, it is possible to implement a brief detection of relative velocity within the region A shown in FIG. 9c.

The output of the differentiator 21 has its polarity inverted by the third subtracter 22, and it is delivered to the focus coil 33 by way of the first switch 17 and second adder 15. The first switch 17, which is turned off following the in-focus detection as mentioned previously, is ON during the sweep operation and accordingly the objective lens 32 is driven in accordance with the output of the differentiator 21. In the region A, if the objective lens 32 approaches the disc surface at an increased velocity (increased relative velocity) by some reason, the differentiator 21 has its output increasing in the positive direction, causing the focus coil drive voltage to rise in the negative direction through the third subtracter 22 so that the objective lens 32 is slowed down.

If, on the other hand, the objective lens 32 starts moving away from the disc surface due to an external impact or the like, the differentiator 21 produces a negative output, causing the focus coil 33 to be driven by a positively increasing drive voltage so that the objective lens 32 is brought nearer to the disc surface. In this manner, the system performs a sort of velocity control for the relative movement between the objective lens 32 and disc 1 when the objective lens passes a specific region in the course of approach to the in-focus point.

The conventional system operates to close the focus servo loop at the in-focus state, and the objective lens is braked only in the region B shown in FIG. 9a by the focus servo action. In contrast, according to the first embodiment of this invention, the same braking force generation as in the conventional system in the region B following the in-focus detection is preceded by the velocity control for the objective lens in the region A which is much greater than the region B, and the braking effect is incomparably greater than the case of using the region B only.

Even in case the objective lens 32 is swept at a high velocity intentionally or it is vibrating in circumstances of external random impacts, the objective lens 32 enters the state of velocity control when it reaches the region A in proximity to the in-focus point so that it approaches slowly to the disc surface during the passage of the wide control region A and reaches the in-focus point at the low velocity, whereby the servo pull-in operation with the closed focus servo loop is conducted reliably. Around the in-focus point, where the RF signal has a flat envelope, the system is incapable of detecting the relative velocity and therefore velocity control does not take place. However, this dead zone of control is very narrow and it is less likely that the objective lens 32 accelerates during the passage of this region in response to the sweep signal or external impacts.

Figure 5:
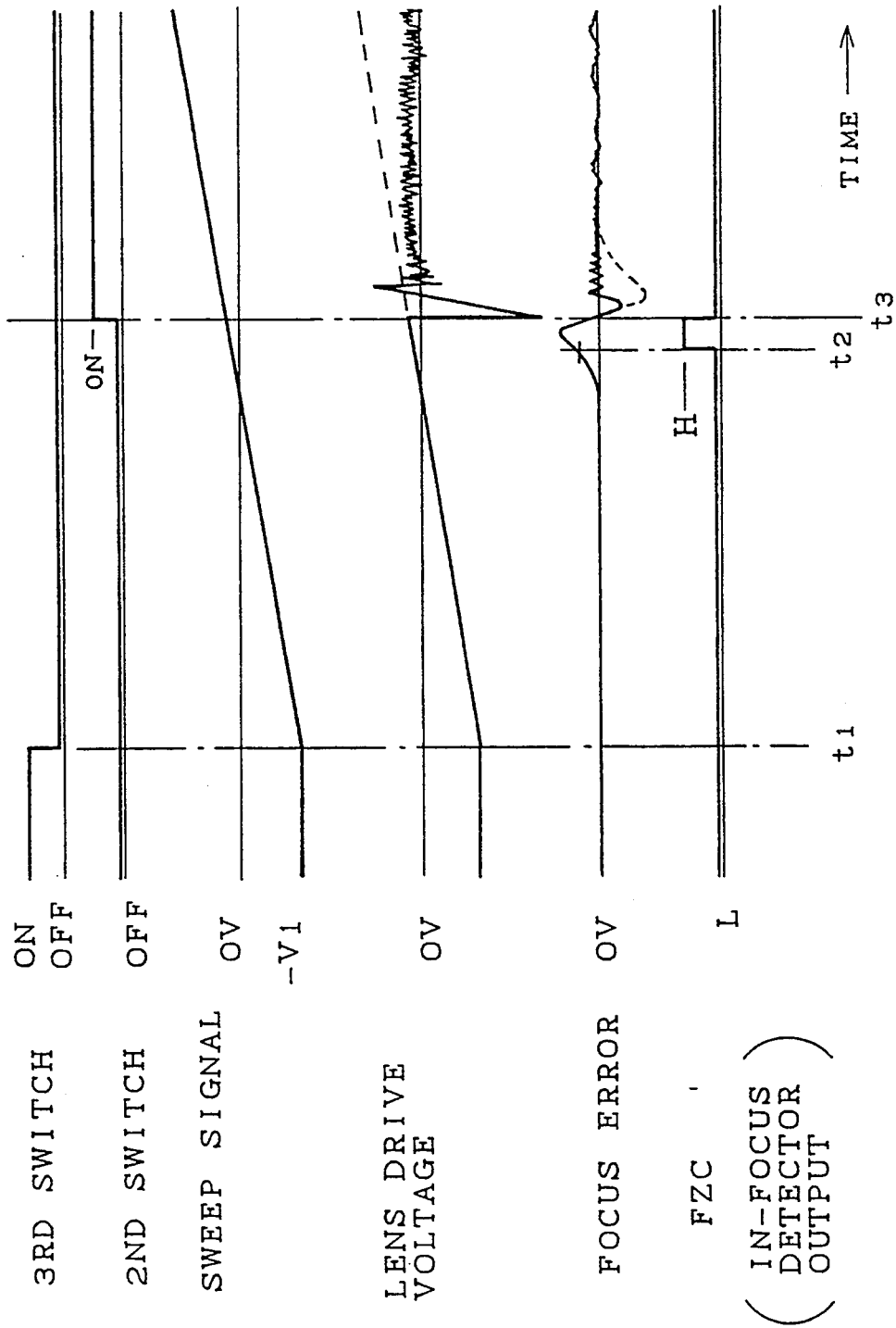
FIG. 5 is a waveform diagram showing the signals of various portions of the conventional focus servo system.
Figure 6:
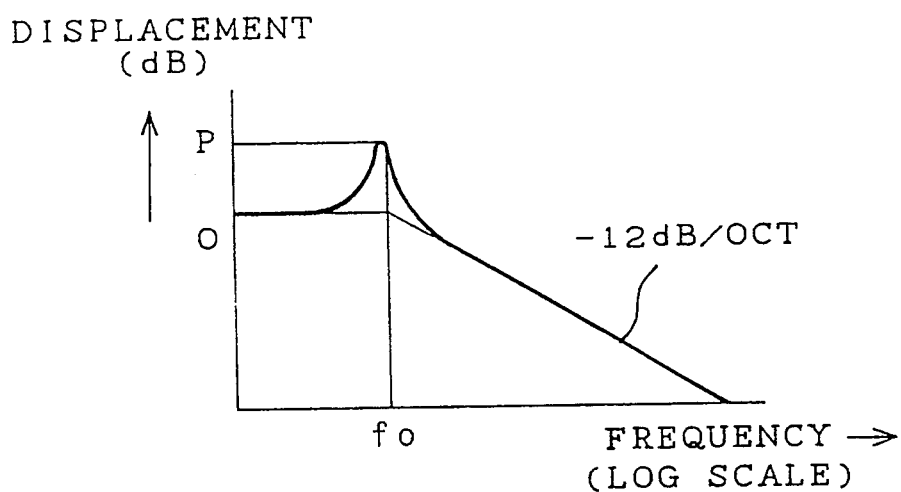
FIG. 6 is a graph of frequency response, which is assessed in terms of the output displacement relative to the drive signal level, of the suspension system of the conventional focus servo system.
Figure 7:
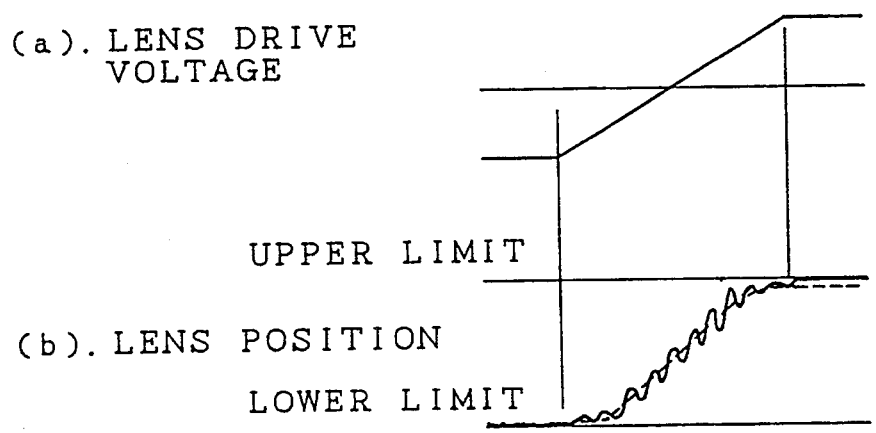
FIG. 7 is a diagram showing the lens drive voltage and the lens movement of the conventional focus servo system which is operated in a vibratory environment.
Figure 10:
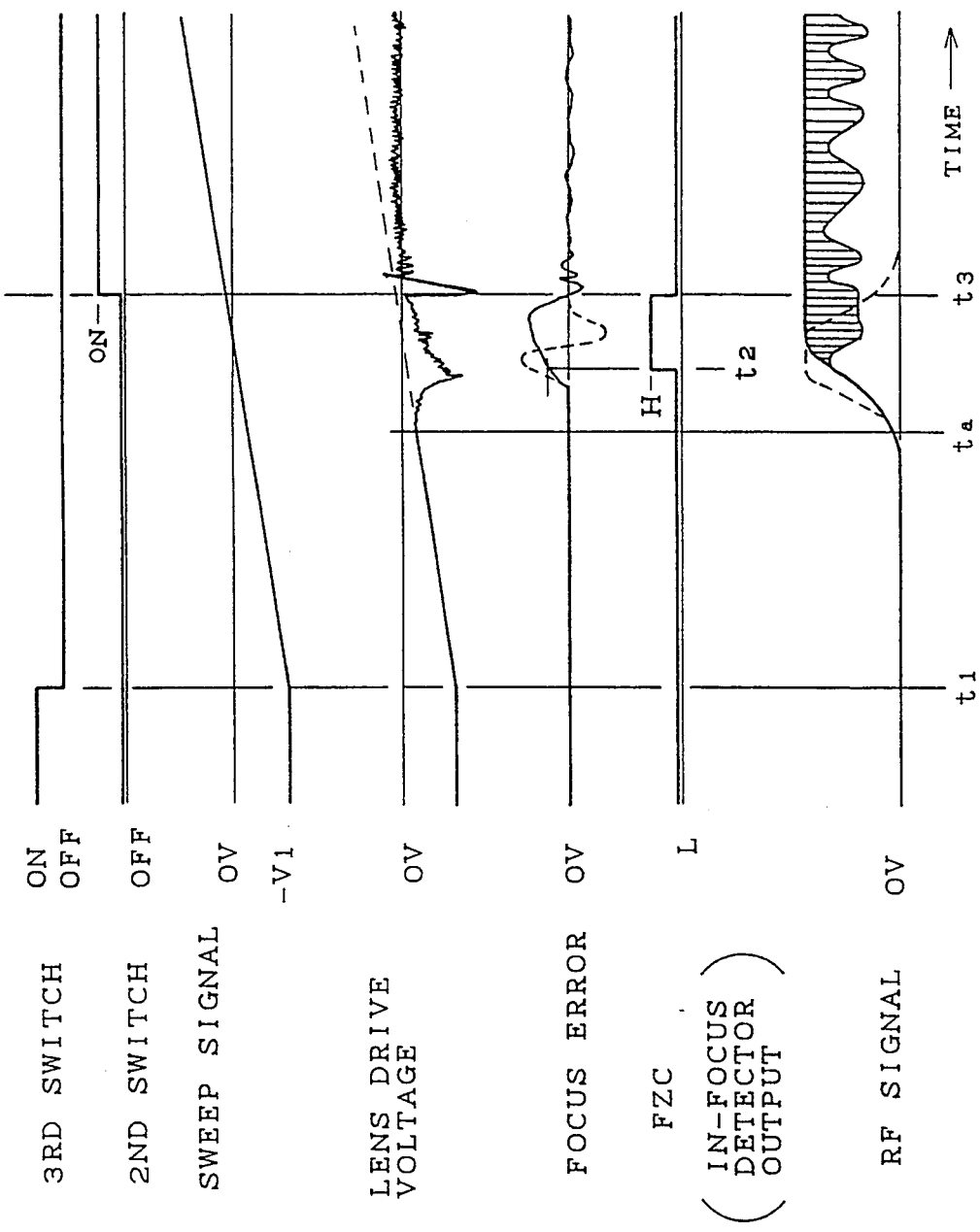
FIG. 10 is a waveform diagram showing the signals of various portions of this focus servo system.

FIG. 10 shows the waveforms of various signals, which compare to those of FIG. 5 inclusive of the meaning of time points t1 and t3 and the operation of the switches. FIG. 10 further includes the waveform of the RF signal. The waveforms shown by the dashed lines are the case when the objective lens 32 is moved at a constant velocity.

The sweep operation begins at time point t1 and the objective lens 32 approaches the disc surface by some distance. When the RF signal begins to emerge at time point ta, the lens drive voltage rises in the negative direction in response to the positive gradient of the envelope of the RF signal, causing the lens velocity to fall, and the waveform of the focus error signal extends along the time axis.

When the objective lens enters the in-focus state at t3, the focus servo loop is closed so that the lens position is controlled to maintain the in-focus state as in the operation of the conventional system. In the time range shown in the figure, the tracking servo system does not yet function and the reading beam is moving across tracks, and the RF signal after t3 has a corrugated waveform of its lower envelope.

Conventionally, CD players are generally designed to provide the objective lens with a movable range of about 1.5 mm and such a moving speed as to sweep this range in 0.7 to 2 seconds. According to the experiment for the arrangement of this first embodiment conducted by the inventors of the present invention, it was confirmed that the pull-in operation even at such a high sweep speed as traveling the above-mentioned movable range in 0.15 second is performed at a sufficiently high rate of success. For a vehicle-mount CD player using a pickup having a suspension system with a fo frequency of about 18 Hz, the measurement of the critical external vibration by which the rate of success of focus pull-in falls to a certain value revealed that the arrangement of this first embodiment is more resistive by about four times against a sinusoidal external vibration of 18 Hz as compared with the conventional arrangement.

Embodiment 2

Figure 1:
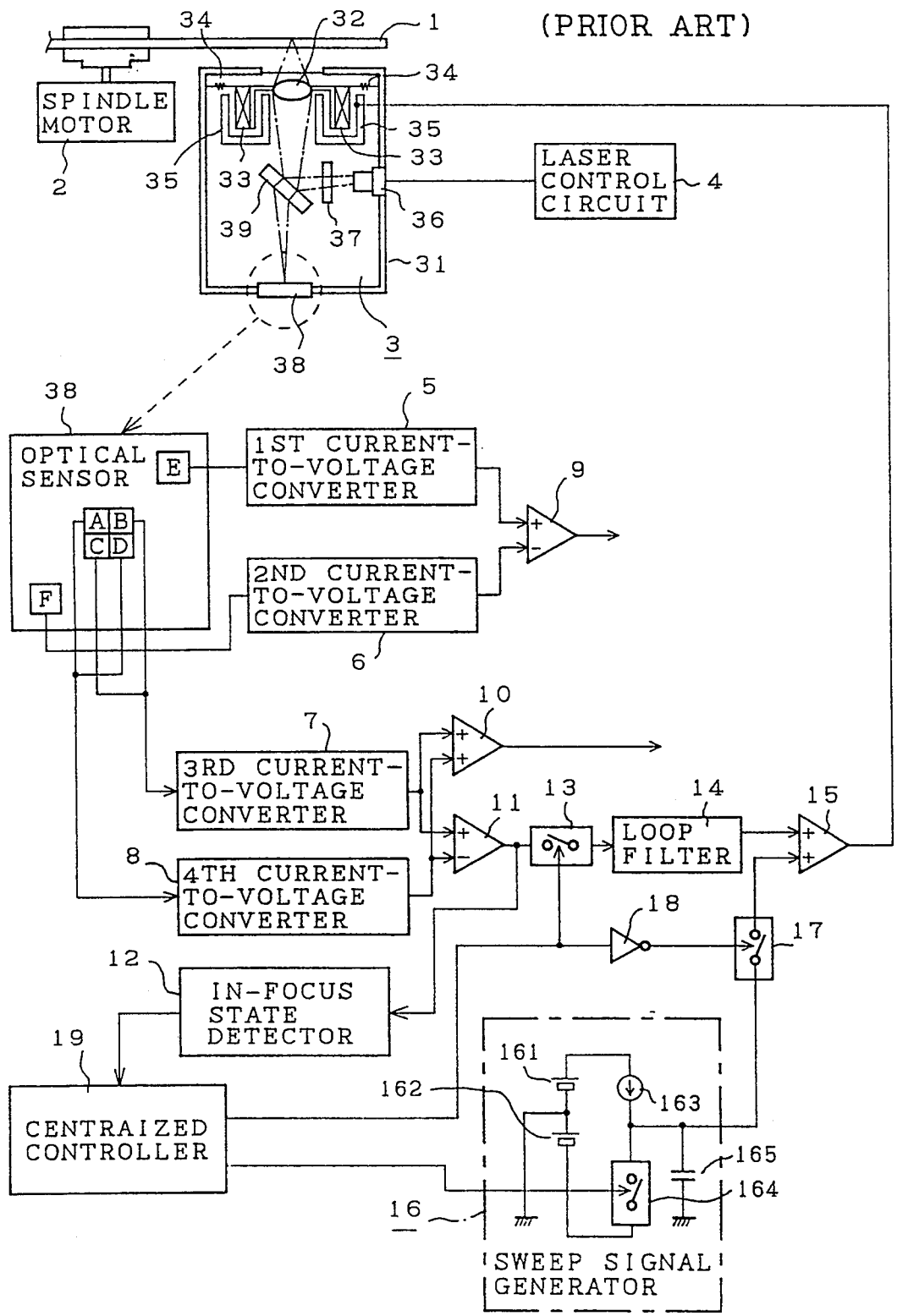
FIG. 1 is a block diagram of the conventional focus servo system for CD players.
Figure 2:
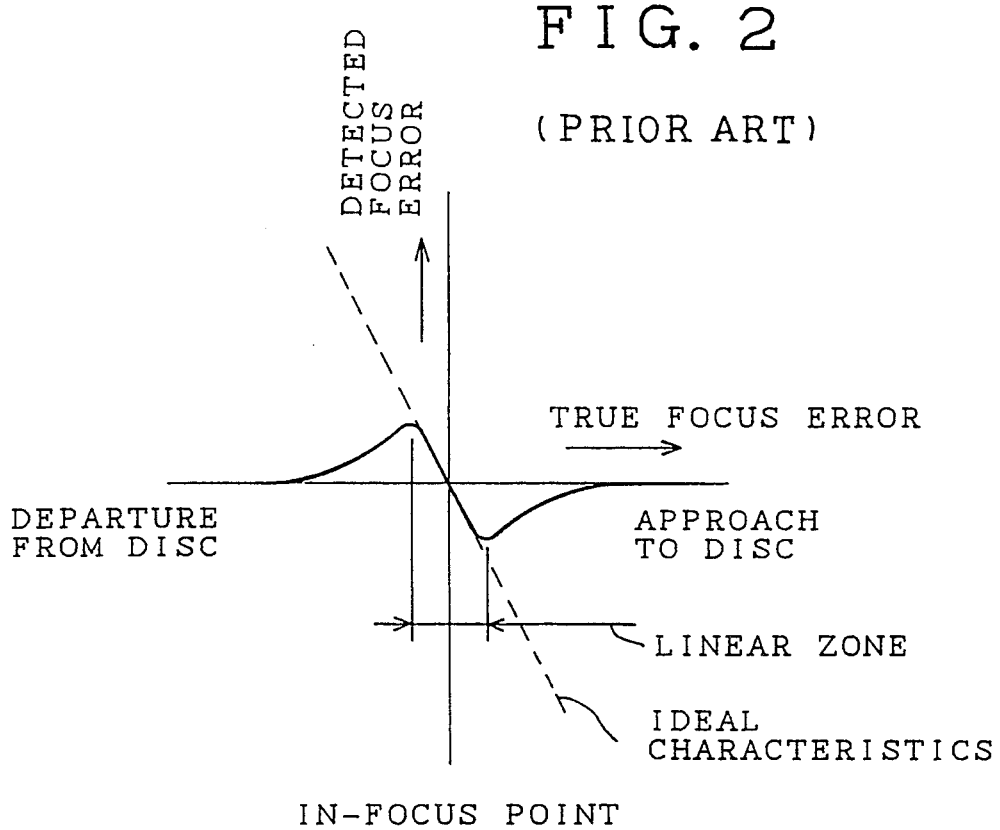
FIG. 2 is a graph of the focus error detection characteristics of the conventional system.
Figure 3:
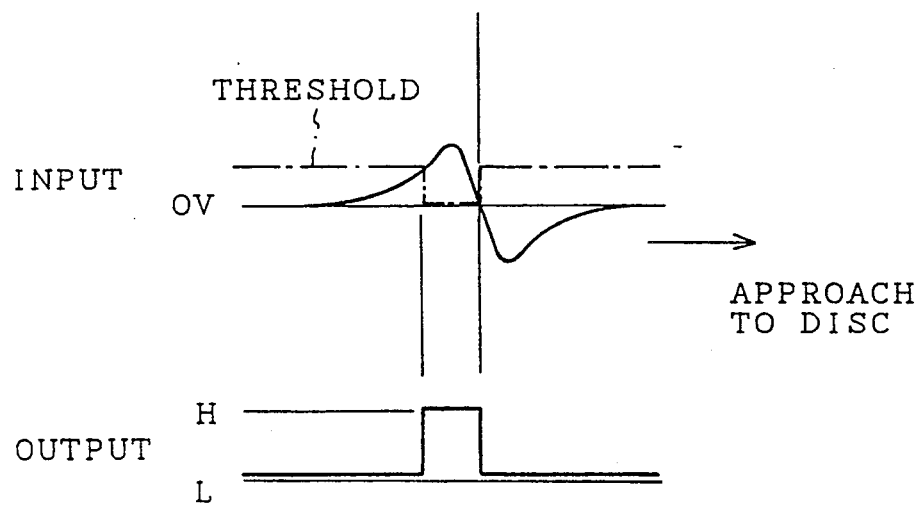
FIG. 3 is a waveform diagram showing the input and output signals of the conventional in-focus state detector.
Figure 4:
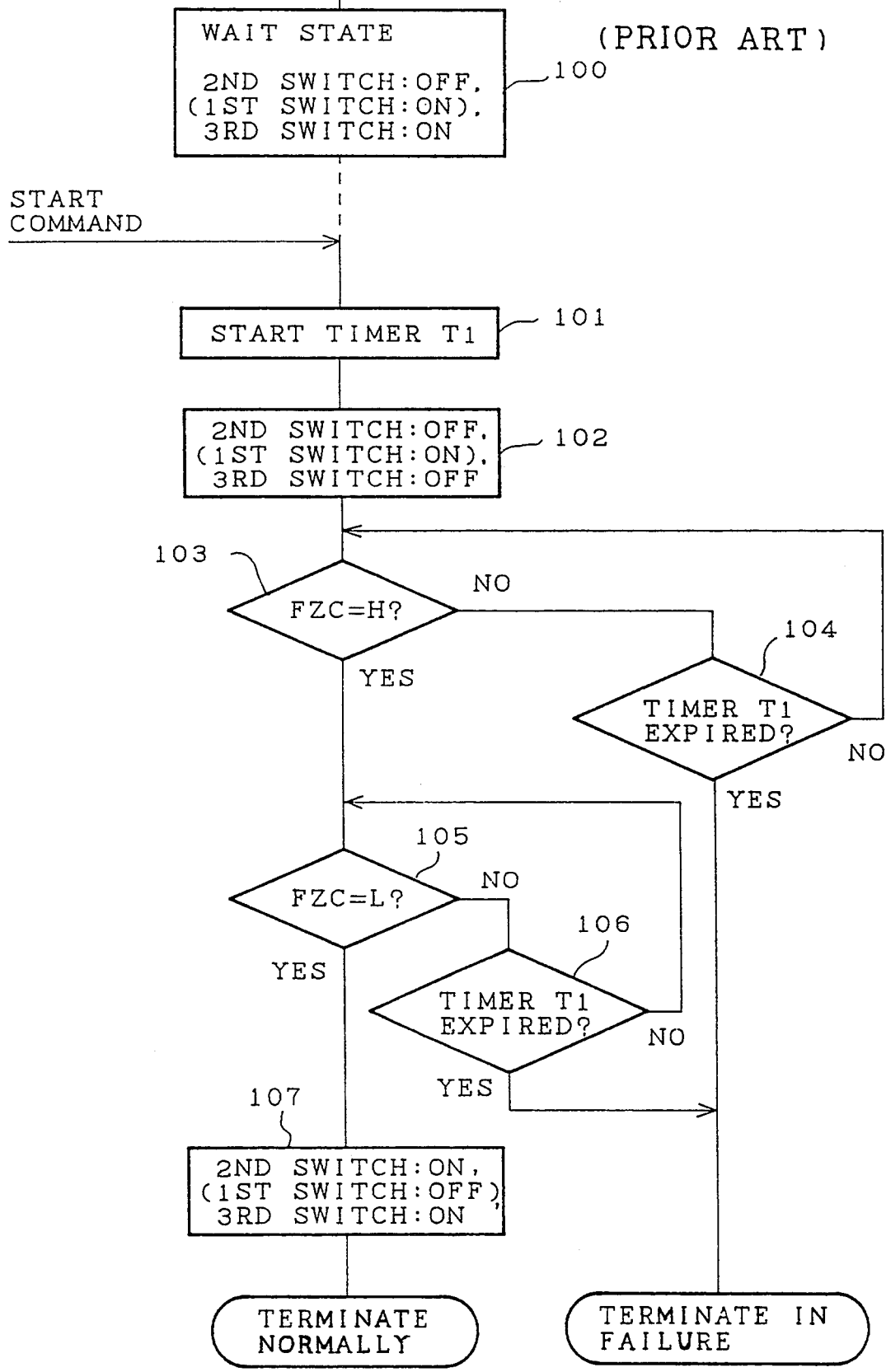
FIG. 4 is a flowchart showing the operation of the conventional centralized controller.
Figure 11:
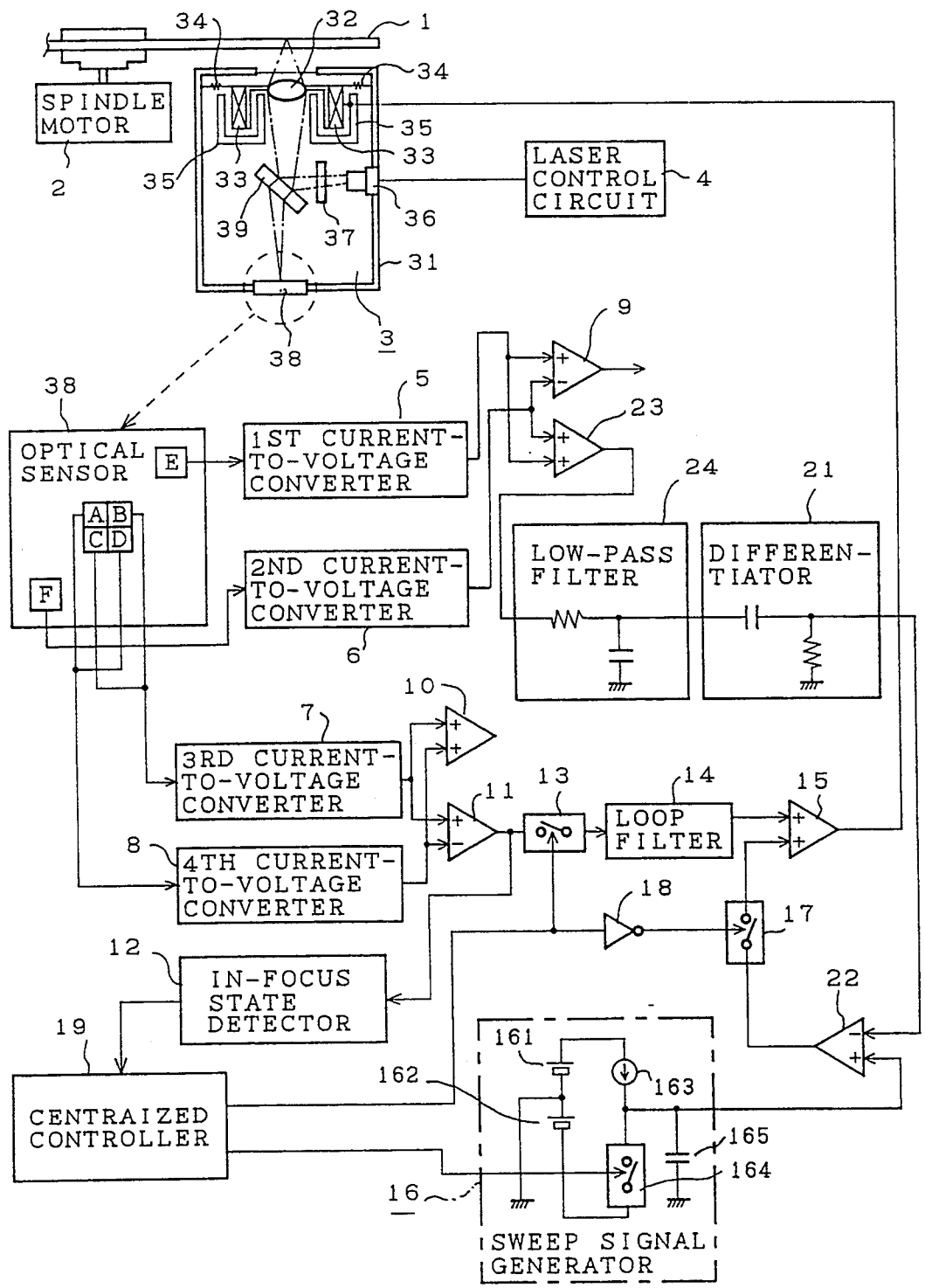
FIG. 11 is a block diagram of the focus servo system for CD players according to the second embodiment of this invention.

FIG. 11 shows the arrangement of the focus servo system for CD players according to the second embodiment of this invention. In the figure, functional blocks identical to those of FIG. 1 are referred to by the same symbols. The system includes a third adder 23 which composes the outputs of the first and second current-to-voltage converters 5 and 6, and a low-pass filter (LPF) 24 made up of a resistor and a capacitor. The centralized controller 19 operates in the same manner as shown in the flowchart of FIG. 4. The second embodiment differs from the first embodiment in the signal source and means of producing the velocity signal.

The optical sensor produces outputs of its sensing areas E and F for the two subordinate beams of tracking error detection. These current signals are converted into voltage signals by the first and second current-to-voltage converters 5 and 6, and the resulting voltage signals are summed by the third adder 23.

Figure 12:
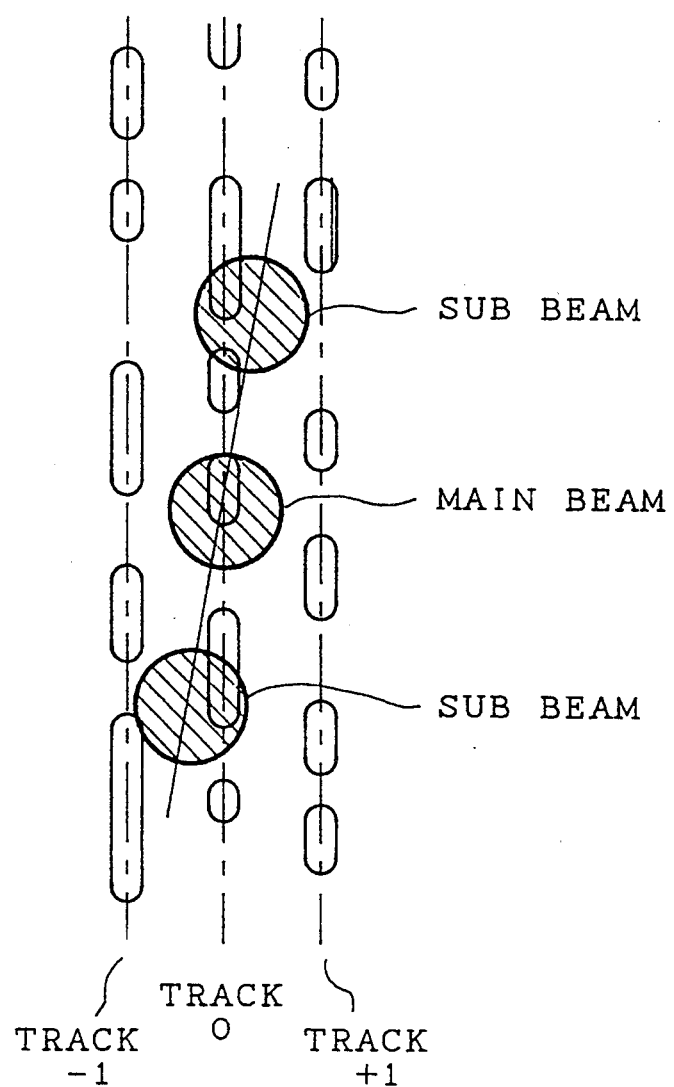
FIG. 12 is a diagram showing the positional relation of the three beam spots on the disc surface of a CD player according to the 3-beam system.

FIG. 12 shows the subordinate beams for tracking error detection spotted on the disc surface, and it specifically shows the positional relation among tracks and three reading light spots (hatched circles) on the disc surface. The main beam spot located at the center carries recorded information, which is retrieved from the reflected beam. Located on both sides of the main beam spot are the subordinate beam spots. The line which extends through the center of the two subordinate beam spots is not parallel to the track, and the center of the subordinate beams deviate from the track center when the main beam traces the track center correctly.

When the main beam moves from the track center to the right in FIG. 12, the upper subordinate beam comes into the region between tracks and it is rendered a decreased degree of modulation by the tracks, resulting in a decreased fall of the lower envelope of the reproduced signal around the in-focus point as shown in FIG. 13a. At this time, the lower subordinate beam comes to the track center and it is rendered a deeper modulation by the track, resulting in an increased fall of the lower envelope of the reproduced signal as shown in FIG. 13b (this is the same case as shown in FIG. 9b).

In FIGS. 13a, 13b and 13c, the dashed lines indicate the mean values, with harmonic components being eliminated, and deeper the modulation by the track, the greater is the fall in the signal levels around the in-focus point. Shown in FIG. 13c is the sum of the reproduced signals derived from the two reflected subordinate beams. The composed signal has its recess around the in-focus point less affected by the positional relation of the light beams and tracks, and its depth is intermediate between those of FIGS. 13a and 13b. This is based on the fact that the signals of reflected beams have their average levels affected oppositely by a change in the positional relation with the tracks, and as a result of summation of the signals the variations of level cancel out with each other.

The second embodiment utilizes the above-mentioned fact that the composed signal derived from the reflected subordinate beams has a smaller level variation around the in-focus point, and it is designed to produce the velocity signal by differentiating the composed signal intact without through the envelope detection. Consequently, the detector 20 for the envelope detection can be eliminated and the circuit arrangement is simplified. The low-pass filter 24 has a role of reducing, by averaging, record signal components unneeded for the velocity detection. The second embodiment achieves the same effectiveness as of the first embodiment.

Embodiment 3

Figure 14:
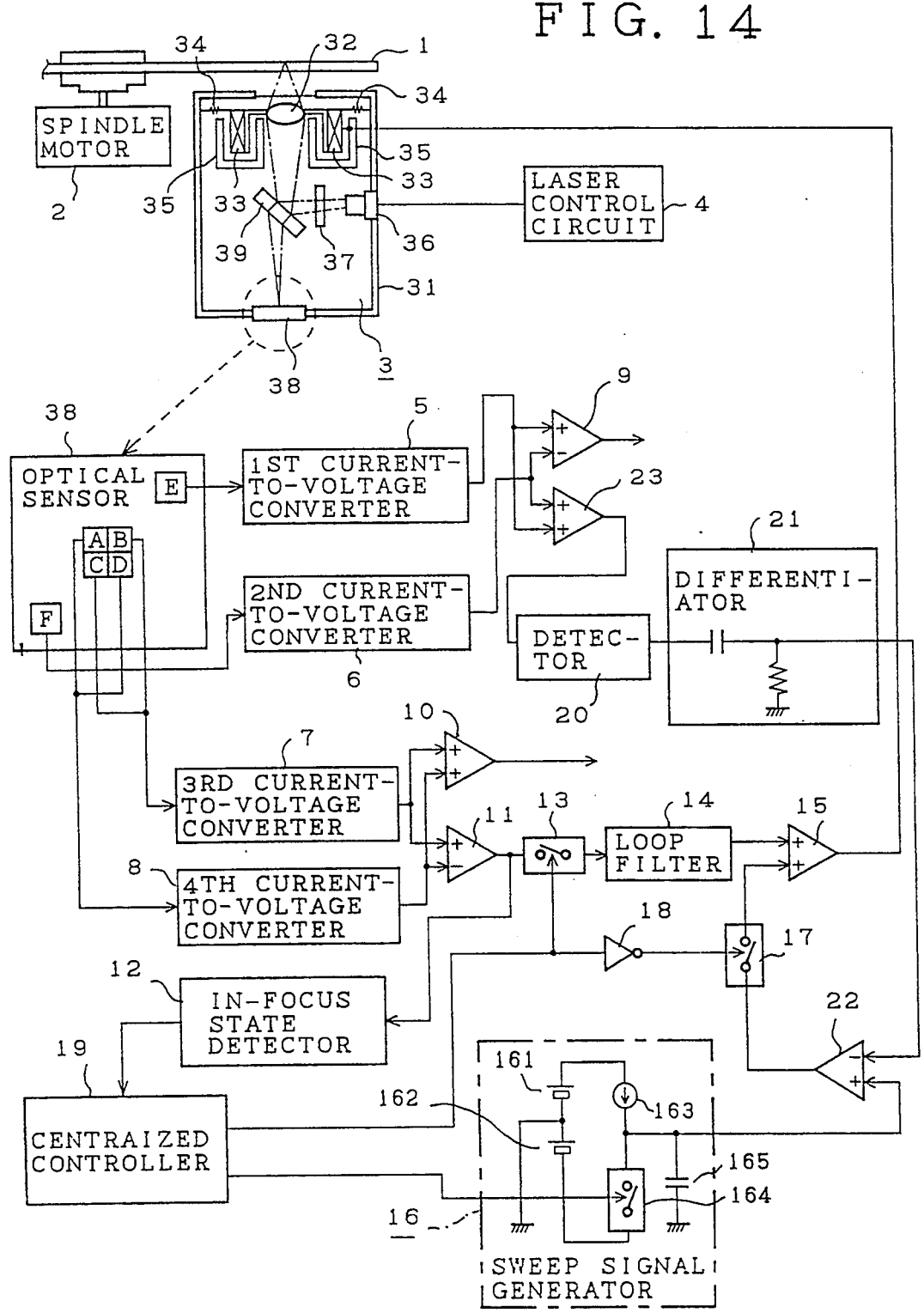
FIG. 14 is a block diagram of the focus servo system for CD players according to the third embodiment of this invention.

FIG. 14 shows the arrangement of the focus servo system for CD players according to the third embodiment of this invention. This embodiment, which compares with the second embodiment, includes a detector 20 for envelope detection in place of the low-pass filter 24.

In the second embodiment, in which the composed signal produced from the reflected subordinate beams is used with the intention of eliminating the detector 20, the signal has a recess of level in region C around the in-focus point as shown by the dashed line in FIG. 13c. The gradient of the signal in this region is opposite to that of region A, and the system has a positive feedback of velocity control in the region C. Consequently, after the sweep speed has been lowered properly in the region A, it is raised unnecessarily in the region C immediately before the in-focus point. On this account, when it is intended to enhance the velocity control performance by increasing the loop gain, the objective lens 32 is accelerated in the region C, resulting in a degraded pull-in performance. Therefore, the second embodiment is limited in its effectiveness.

The third embodiment is intended to reduce the recess of level of the composed signal derived from the reflected subordinate beams around the in-focus point through the provision of a detector 20 which implements envelope detection for the signal. The composed signal includes a smaller amount of modulation component caused by the recorded signal as compared with the RF signal of the first embodiment, and therefore it enables the velocity detection to be less disturbed by the unrelated signal component and ensures the stability of movement of the objective lens 23 when the velocity control loop gain is raised for the enhanced performance. In the third embodiment, the composed signal derived from the reflected subordinate beams is detected and differentiated so that the velocity control is sharpened and at the same time stabilized, whereby the sweep speed can be raised and the pull-in operation is ensured by suppressing external impacts. The remaining arrangement and operation of the third embodiment are identical to those of the first and second embodiments.

Modified Embodiments

The third embodiment may be modified in such a way that the signal derived from only one of the two reflected subordinate beams for tracking error detection is rendered the detection and differentiation for producing the velocity signal, and the same effectiveness as in the first embodiment of using the RF signal is achieved. The light beam used to produce the velocity signal may be of any type provided that the envelope of the signal has a trapezoidal profile in response to the relative position between the focus position and the disc surface. For example, an alternative arrangement may include a pair of light source and optical sensor dedicated to velocity detection, or may include an additional optical sensor which is sensitive to another subordinate beam for velocity detection.

The present invention is applicable to multi-beam optical recording/playback apparatus which read and/or write information on a plurality of tracks concurrently, and in this case the velocity signal is produced from a specific reflected beam or from multiple reflected beams.

According to this embodiment, as described above, the moving speed of the focus position is controlled in accordance with the relative velocity between the focus position and the disc surface before the in-focus state is reached during the focus pull-in operation, and a proper relative velocity which ensures successful pull-in is attained at the time of closing the focus servo loop when the objective lens reaches the in-focus point. Even in the case of a higher sweep speed of focus position with the intention of shorter pull-in operation, the relative velocity is lowered quickly in the vicinity to the in-focus point thereby to ensure the successful pull-in. The velocity control is also effective for the enhanced pull-in performance against disturbances which affect the relative velocity at random. The present invention is highly adaptive to a variety of structures of optical pickups and heads and to extensive demands of velocity control performance.

What is claimed is:

1. A focus control system comprising:
   a light source outputting a light beam;
   optical means for focusing said light beam produced by said light source and for collecting a reflected beam of said light beam from a recording surface of a recording medium;
   optical sensor means for converting said reflected light beam into electrical signals;
   focus error detection means for producing an error signal indicative of a distance between said light beam's focus position and said recording medium surface;
   focus moving means for driving said optical means so as to move said focus position;
   an automatic focus control system which drives said focus moving means in accordance with said error signal so that said focus position of said light beam is located on said recording medium surface;
   means for opening or closing a control loop of said focus control system;
   detection means for detecting an envelope of at least one of said electrical signals;
   differentiation means for differentiating an output of said detection means to obtain a signal representing a relative velocity of said optical means to said recording medium;
   in-focus state detection means for detecting an in-focus state based on at least said error signal;
   sweep signal generation means for generating a sweep signal for moving said focus position;
   sweep control means for driving said focus moving means in accordance with said sweep signal and an output of said differentiation means; and
   control means for controlling said loop opening/closing means in response to the result of detection of said in-focus state detection means.

2. The focus control system of claim 1, wherein:
   said optical sensor means converts said reflected light beam into at least first and second electrical signals; and
   said focus error detection means includes a subtractor for subtracting said first electric signal from said second electric signal to produce said error signal.

3. The focus control system of claim 2, further comprising:
   an adder for adding said first and second electrical signals; and wherein
   said detection means detects said envelope based on output from said adder.

4. The focus control system of claim 1, wherein said differentiation means includes a capacitor and a resistor.

5. The focus control system of claim 1, wherein said sweep control means includes arithmetic processing means for generating a signal to drive said focus position moving means by performing an arithmetic operation on said sweep signal and said output from said differentiation means.

6. The focus control system of claim 5, wherein said arithmetic processing means includes a subtractor for subtracting said output from said differentiation means from said sweep signal to generate a signal for driving said focus moving means.

7. The focus control system of claim 1, wherein said loop opening/closing means includes at least one switch.

8. The focus control system of claim 1, further comprising:
   an adder; and wherein
   said optical sensor means converts said reflected light beam into at least first and second signals; and
   said adder adds said first and second signals; and
   said detection means detects said envelope based on output from said adder.

9. A focus control system comprising:
   a light source outputting a light beam;
   light beam division means for splitting said light beam produced by said light source into a plurality of light beams;
   optical means for focusing said split light beams and for collecting reflected beams of said split light beams from a recording surface of a recording medium;
   optical sensor means for converting said reflected light beams into electrical signals;
   focus error detection means for producing an error signal indicative of a distance between said split light beam's focus position and said recording medium surface;
   focus moving means for driving said optical means so as to move said focus position;
   an automatic focus control system which drives said focus moving means in accordance with said error signal so that said focus position of said split light beams is located on said recording medium surface;
   means for opening or closing a control loop of said focus control system;
   composing means for composing outputs of said optical sensor means derived form specific ones of said split light beams;
   differentiation means for differentiating output of said composition means to obtain a signal representing a relative velocity of said optical means to said recording medium;
   in-focus state detection means for detecting an in-focus state based on at least said error signal;
   sweep signal generation means for generating a sweep signal for moving said focus position;
   sweep control means for driving said focus moving means in accordance with said sweep signal and an output of said differentiation means; and
   control means for controlling said loop opening/closing means in response to the result of detection of said in-focus state detection means.

10. A focus control system according to claim 9, further comprising detection means for detecting an envelope of an output signal of said composing means;

and wherein said differentiation means differentiates output from said detection means.

11. The focus control system of claim 9, wherein:
said optical sensor means converts said reflected light beam into at least first and second electrical signals; and
said focus error detection means includes a subtractor for subtracting said first electric signal from said second electric signal to produce said error signal.

12. The focus control system of claim 9, wherein said differentiation means includes a capacitor and a resistor.

13. The focus control system of claim 9, wherein said sweep control means includes arithmetic processing means for generating a signal to drive said focus position moving means by performing an arithmetic operation on said sweep signal and said output from said differentiation means.

14. The focus control system of claim 13, wherein said arithmetic processing means includes a subtractor for subtracting said output from said differentiation means from said sweep signal to generate a signal for driving said focus moving means.

15. The focus control system of claim 9, wherein said loop opening/closing means includes at least one switch.

16. The focus control system of claim 9, further comprising:
an adder; and wherein
said optical sensor means converts said reflected light beam into at least first and second signals; and
said adder adds said first and second signals; and
said detection means detects said envelope based on output from said adder.

17. The focus control system of claim 9, wherein said light beam division means splits said light beam into a main light beam and a first and second sub-light beam.

18. The focus control system of claim 17, wherein:
said optical sensor means converts reflected light corresponding to said main beam into at least first and second electrical signals; and
said focus error detection means includes a subtractor for subtracting said first electrical signal from said second electrical signal to produce said error signal.

19. The focus control system of claim 17, wherein:
said optical sensor means converts reflected light corresponding to said first sub-light beam and said second sub-light beam into first and second electrical signals, respectively; and
said composing means composes said first and second electrical signals.

20. The focus control system of claim 19, wherein said composing means includes an adder which adds said first and second electrical signals.

21. The focus control system of claim 20, further comprising:
a detection means for detecting an envelope of an output of said composing means; and wherein
said differentiation means differentiates output from said detection means.

22. The focus control system of claim 20, further comprising:
filter means for filtering an output signal of said composing means; and wherein
said differentiation means differentiates output from said filter means.

23. The focus control system of claim 22, wherein said filter means includes a resistor and a capacitor.

24. The focus control system of claim 19, wherein:
said optical sensor means converts reflected light corresponding to said main beam into at least third and fourth electrical signals; and
said focus error detection means includes a subtractor for subtracting said third electrical signal from said fourth electrical signal to produce said error signal.

25. The focus control system of claim 9, further comprising:
filter means for filtering an output signal of said composing means; and wherein
said differentiation means differentiates output from said filter means.

26. The focus control system of claim 25, wherein said filter means includes a resistor and a capacitor.

27. A focus control system for controlling a focusing unit to focus a light beam on a surface of a recording medium, comprising:
an automatic focus control system which drives said focusing unit in accordance with a received focus error signal so that a focus position of said light beam is located on said surface of said recording medium;
means for opening or closing a control loop of said focus control system;
differentiation means for generating a differentiation signal representing a relative velocity of said focusing unit to said recording medium based on electrical signals representing a reflected beam of said light beam from said surface of said recording means;
in-focus state detection means for detecting an in-focus state based on at least said error signal;
sweep signal generation means for generating a sweep signal for moving said focusing unit and thus said focus position;
sweep control means for driving said focusing unit in accordance with said sweep signal and said differentiation signal; and
control means for controlling operation of said loop opening/closing means based on output from said in-focus state detection means.

28. The focus control system of claim 27, further comprising:
detection means for detecting an envelope of said electrical signals representing said reflected beam of said light beam from said surface of said recording means; and wherein
said differentiation means generates said differentiation signal by differentiating output from said detection means.

29. A focus control system for controlling a focusing unit to focus a plurality of light beams on a surface of a recording medium, comprising:
an automatic focus control system which drives said focusing unit in accordance with a received focus error signal so that a focus position of said plurality of light beams is located on said surface of said recording medium;
means for opening or closing a control loop of said focus control system;
differentiation means for generating a differentiation signal representing a relative velocity of said focusing unit to said recording medium based on electrical signals representing reflected beams of certain ones of said plurality of light beams from said surface of said recording means;

in-focus state detection means for detecting an in-focus state based on at least said error signal;

sweep signal generation means for generating a sweep signal for moving said focusing unit and thus said focus position;

sweep control means for driving said focusing unit in accordance with said sweep signal and said differentiation signal; and control means for controlling operation of said loop opening/closing means based on output from said in-focus state detection means.

30. The focus control system of claim 26, further comprising:

detection means for detecting an envelope of said electrical signals representing said reflected beams of said certain ones of said plurality of light beams from said surface of said recording means; and wherein said differentiation means generates said differentiation signal by differentiating output from said detection means.

31. The focus control system of claim 29, further comprising:

filter means for filtering said electrical signals representing said reflected beams of said certain ones of said plurality of light beams from said surface of said recording means; and wherein said differentiation means generates said differentiation signal by differentiating output from said filter means.

32. The focus control system of claim 29, further comprising:

composing means for composing said electrical signals representing said reflected beams of said certain ones of said plurality of light beams from said surface of said recording means; and wherein said differentiation means generates said differentiation signal by differentiating output from said composing means.

33. A focus control system comprising:

a light source outputting a light beam;

light beam division means for splitting said light beam produced by said light source into a plurality of light beams;

optical means for focusing said split light beams and for collecting reflected beams of said split light beams from a recording surface of a recording medium;

optical sensor means for converting said reflected light beams into electrical signals;

focus error detection means for producing an error signal indicative of a distance between said split light beam's focus position and said recording medium surface;

focus moving means for driving said optical means so as to move said focus position;

an automatic focus control system which drives said focus moving means in accordance with said error signal so that said focus position of said split light beams is located on said recording medium surface;

means for opening or closing a control loop of said focus control system;

detection means for detecting an envelope of said electrical signals;

differentiation means for differentiating output of said detection means to obtain a signal representing a relative velocity of said optical means to said recording medium;

in-focus state detection means for detecting an in-focus state based on at least said error signal;

sweep signal generation means for generating a sweep signal for moving said focus position;

sweep control means for driving said focus moving means in accordance with said sweep signal and an output of said differentiation means; and control means for controlling said loop opening/closing means in response to the result of detection of said in-focus state detection means.

34. A focus control system comprising:

a light source outputting a light beam;

light beam division means for splitting said light beam produced by said light source into a plurality of light beams;

optical means for focusing said split light beams and for collecting reflected beams of said split light beams from a recording surface of a recording medium;

optical sensor means for converting said reflected light beams into electrical signals;

focus error detection means for producing an error signal indicative of a distance between said split light beam's focus position and said recording medium surface;

focus moving means for driving said optical means so as to move said focus position;

an automatic focus control system which drives said focus moving means in accordance with said error signal so that said focus position of said split light beams is located on said recording medium surface;

means for opening or closing a control loop of said focus control system;

filter means for filtering said electrical signals;

differentiation means for differentiating output of said filtering means to obtain a signal representing a relative velocity of said optical means to said recording medium;

in-focus state detection means for detecting an in-focus state based on at least said error signal;

sweep signal generation means for generating a sweep signal for moving said focus position;

sweep control means for driving said focus moving means in accordance with said sweep signal and an output of said differentiation means; and control means for controlling said loop opening/closing means in response to the result of detection of said in-focus state detection means.

* * * * *